United States Patent [19]
Tsai

[11] Patent Number: 6,097,026
[45] Date of Patent: *Aug. 1, 2000

[54] CCD SELF-ALIGNMENT DEVICE FOR OPTICAL SCANNER

[75] Inventor: Jenn Tsair Tsai, Pa-Li, Taiwan

[73] Assignee: Mustek System Inc., Hsinchu, Taiwan

[ * ] Notice: This patent issued on a continued prosecution application filed under 37 CFR 1.53(d), and is subject to the twenty year patent term provisions of 35 U.S.C. 154(a)(2).

[21] Appl. No.: 09/100,843

[22] Filed: Jun. 19, 1998

[51] Int. Cl.$^7$ ........................................................ H01J 5/02
[52] U.S. Cl. ................................................................ 250/239
[58] Field of Search ................................. 250/239, 559.3, 250/548, 216; 356/399–402; 257/433, 434

[56] References Cited

U.S. PATENT DOCUMENTS 4,646,142  2/1987  Levine ...................................... 356/401
5,736,738  4/1998  Movaghar et al. ...................... 250/234

Primary Examiner—Que T. Le
Attorney, Agent, or Firm—W. Wayne Liauh

[57] ABSTRACT

A device for holding a charge couple device (CCD) in an optical scanner he optical alignment of the CCD to the position of scanned image of document can be easily made. The device includes a holder for holding a lens and providing a focused image taken from the scanned document; and a positioning element precisely fitted to the holder by fitting means, adapting a CCD aligned with the focused image. The positioning element is furnished with a matching hole for carrying a bottom portion of said CCD. Some positioning bosses and holes are correspondingly furnished on the positioning elements and the holder for matching each other so that optical alignment of the CCD relative to the holder can be easily made by the assembly without further adjustment.

11 Claims, 11 Drawing Sheets

CCD SELF-ALIGNMENT DEVICE FOR OPTICAL SCANNER

BACKGROUND OF THE INVENTION

1. Field of the Invention

The present invention relates to a positioning element for holding a charge couple device (CCD) in an optical scanner where the optical alignment of the CCD to the position of the document's image can be easily made in the assembly process without further adjustment.

2. Description of Related Art

In an optical scanner, the image of a scanned document is reflected by some mirrors, focused by a lens and imaged on a CCD, and then transformed into digital signals for processing by computers. In recent manufacturing processes, the assembly of the lens and the CCD has been incorporated into a module in which the lens and the CCD have to be adjusted and aligned into suitable optical positions in order to take sharp image from the document.

Two alignment methods of prior arts are as follows:

1) Electronic Method

As shown in FIG. 1A, an alignment arrangement for an optical scanner includes a sample scale 10, a light source 12, four reflection mirrors 14, a lens 16, and a CCD 18 mounted on a printed circuit board 24. The arrangement corrects the alignment by checking the electronic wave of the scanning signals being transformed from the image of the scale 10 by the CCD 18, and adjusting the position of the CCD 18 relative to the lens 16. In this way, the sample scale 10 is fixed, and the CCD 18 is to be adjusted.

2) Optical Method

As shown in FIG. 1B, an alignment arrangement for an optical scanner includes the same components of FIG. 1A: a sample scale 10, a light source 12, four reflection mirrors 14, a lens 16, and a CCD 18 mounted on a printed circuit board 24. The module of lens 16 and CCD 18 is first settled by using an optical instrument, such as a microscope, to adjust the position of the CCD 18 relative to the lens 16 for a correct focusing. In this way, the CCD 18 and the lens 16 are off-line adjusted.

No matter what method is utilized, the positioning of the CCD 18 has to be provided with in three degrees of freedom as illustrated in FIG. 2.

FIG. 2 shows a composition of a conventional lens and CCD module and its alignment requirement. Firstly, a lens 16 mounted in a holder 20 on an axes 22 is adjustable by using a driver 23 to move inwards or outwards for focusing on a CCD 18. Since the CCD 18 has been soldered on a PCB (printed circuit board) 24, we have to adjust the PCB 24 in movements of X-direction, Z-direction and Y-rotation as illustrated in order to align a scanned image on the optoelectronic elements 47 before fastening the PCB 24 to the holder 20 with two screws 28 movable in two slots 26. Because the adjustment has to be done in aforesaid three degrees of freedom, it is complicated, time consuming and eventually difficult to achieve a reliable alignment.

SUMMARY OF THE INVENTION

It is therefore a primary objective of the present invention to solve the problems of the CCD alignment encountered in prior arts and provide a new simplified device.

The present invention discloses a positioning element for holding a CCD in a manner of accurately positioning the optoelectronic elements of the CCD relative to the positioning element. Some positioning bosses and holes are correspondingly furnished on the positioning elements and the holder for matching each other so that optical alignment of the CCD relative to the holder can be easily made in the assembly without further adjustment.

The other objectives and features of the present invention will become apparent from the following description of preferred embodiments with reference to the accompanying drawings.

DETAILED DESCRIPTION OF THE INVENTION

Figure 1A:
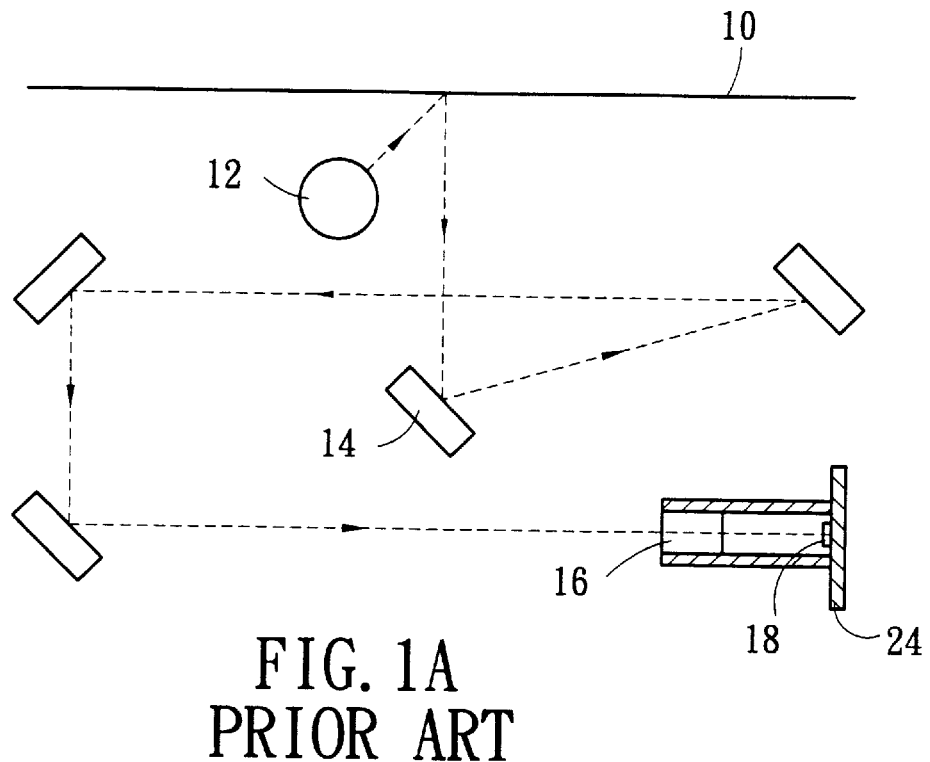
FIG. 1A is a schematic view of the prior art showing an aligning arrangement for an optical scanner in which an electronic method is used.
Figure 1B:
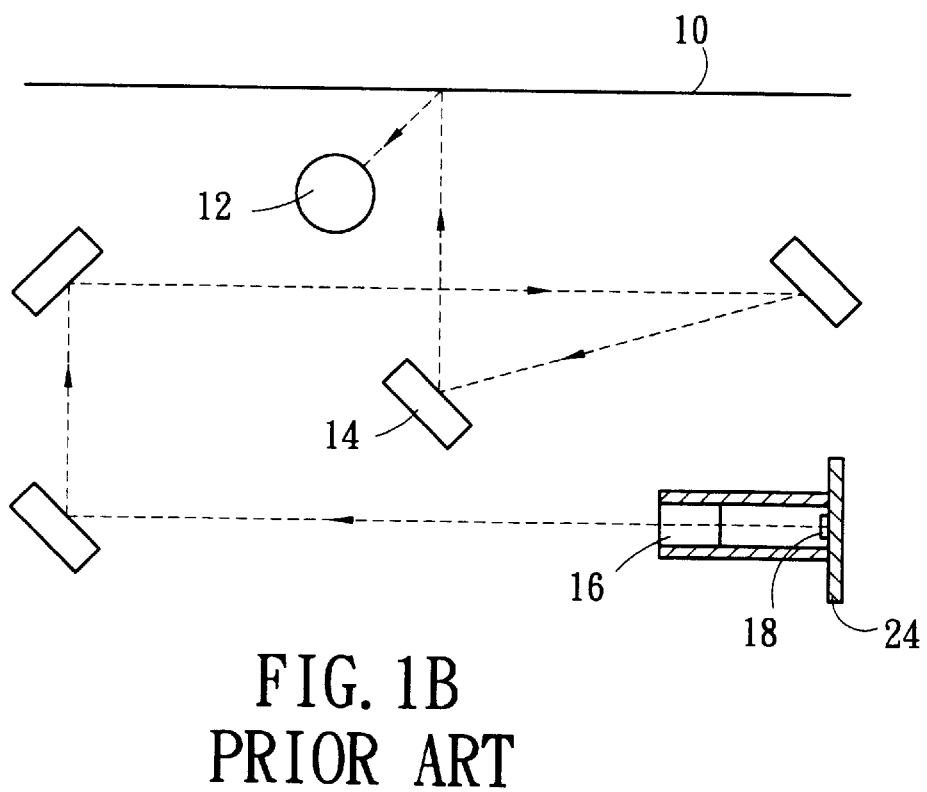
FIG. 1B is a schematic view of the prior art showing an aligning arrangement for an optical scanner in which an optical method is used.
Figure 2:
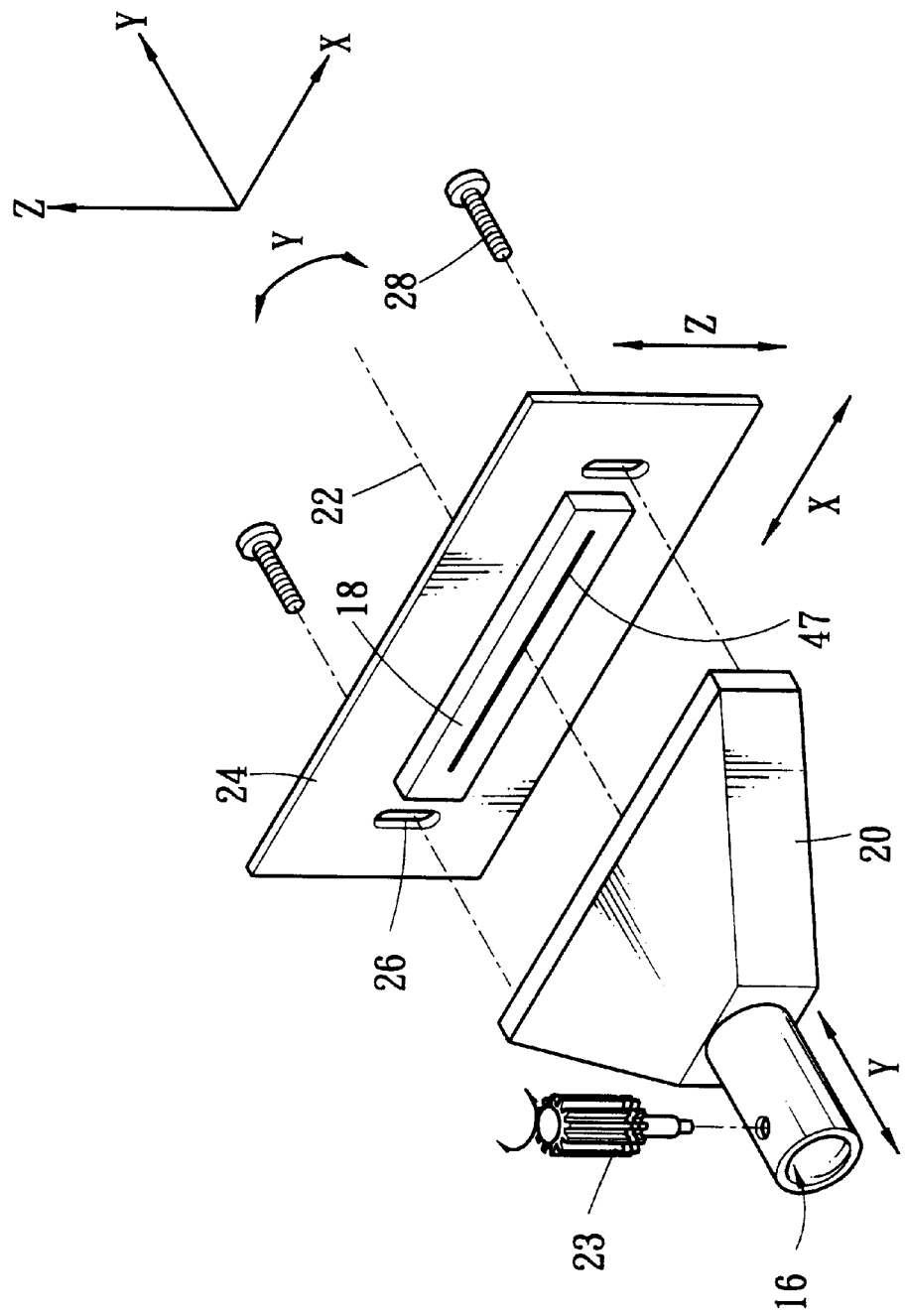
FIG. 2 is an exploded view showing the composition of a conventional lens and CCD module and the alignment requirement thereof.

As in the above description, FIGS. 1A, 1B, and FIG. 2 illustrate aligning methods for optical scanner of prior arts.

Figure 3A:
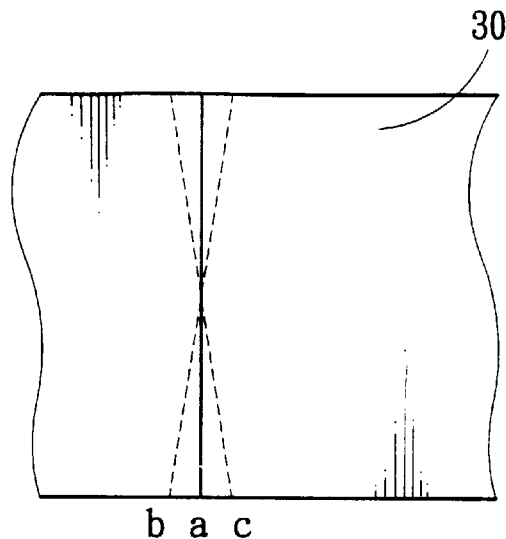
FIGS. 3A, 3B, and 3C illustrate respectively a document to be scanned, a composition of a scanner, and the scanned image.
Figure 3B:
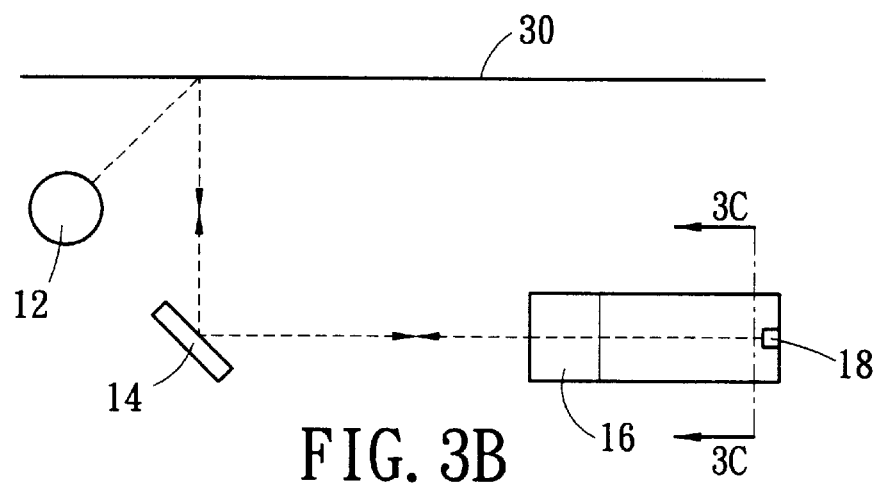
Figure 3C:
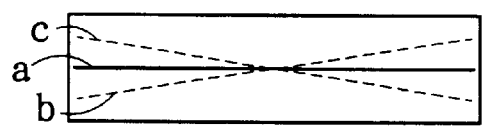

Further referring to FIGS. 3A, 3B, and 3C, a document 30 is scanned by a scanner which includes a light source 12, at least one reflection mirror 14, a lens 16, and a CCD 18. If all the optical elements aligns well, the scanned image of an original line "a" focused by the lens 16 and projected on the CCD 18 is shown in FIG. 3C as image "a" or, under misalignment, a bias image "b" or "c". So the scanner elements, i.e. the reflection mirror 14, the lens 16, and the CCD 18 have to be carefully positioned, especially the CCD 18 that has to be aligned to the focused image "a", "b" or "c". Practically, the variance as of the image "a", "b" or "c" can be controlled in an acceptable range by careful arrangement of the optical elements.

As described in FIG. 2 of prior arts, since the CCD 18 has been soldered on a PCB 24 without any alignment constraint during the soldering process, we have to adjust the PCB 24 in movements of three degrees of freedom in order to achieve the image alignment of the CCD. Because the adjustment of aforesaid three degrees of freedom is complicated, time consuming and eventually difficult, and the present invention intends to simplify the alignment process by controlling the mounting position of the CCD relative to the lens.

The present invention discloses a positioning element for holding a CCD in a manner of accurately positioning the optoelectronic elements of the CCD relative to the positioning element. Some positioning bosses and holes are correspondingly furnished on the positioning elements and the holder for matching each other so that optical alignment of the CCD relative to the holder can be easily made in the assembly without further adjustment.

Figure 4A:
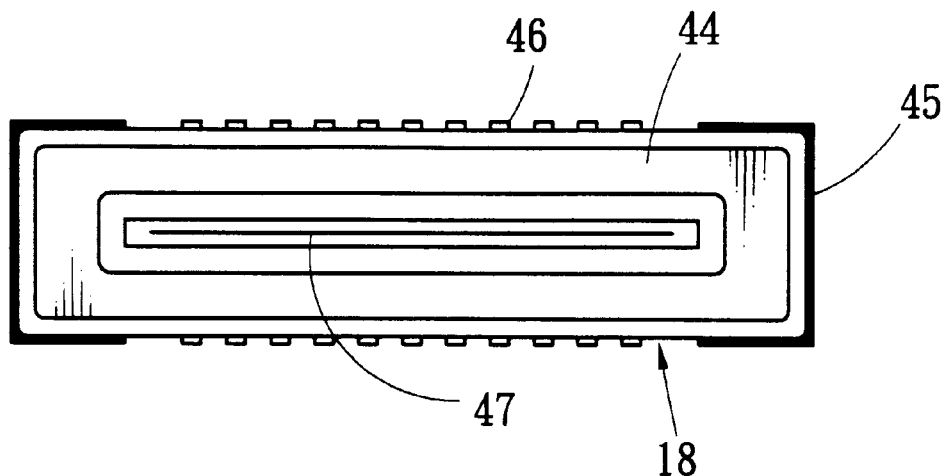
FIGS. 4A, 4B, and 4C illustrate respectively the top view, the front view and the side view of a packaged CCD of the prior arts.
Figure 4B:
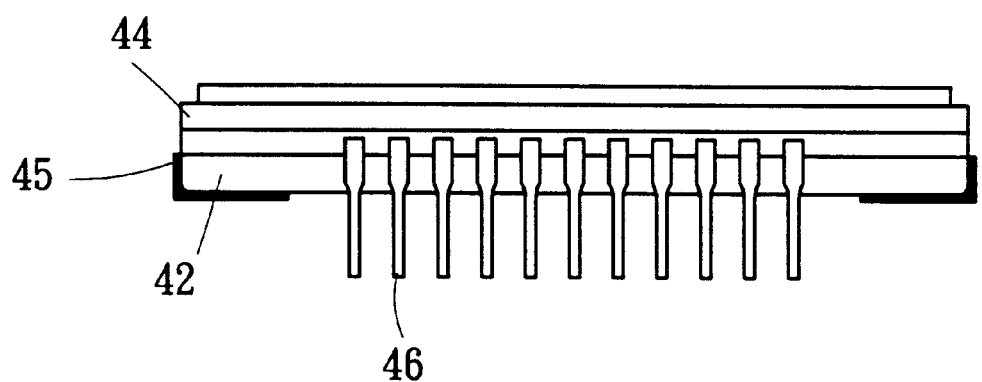
Figure 4C:
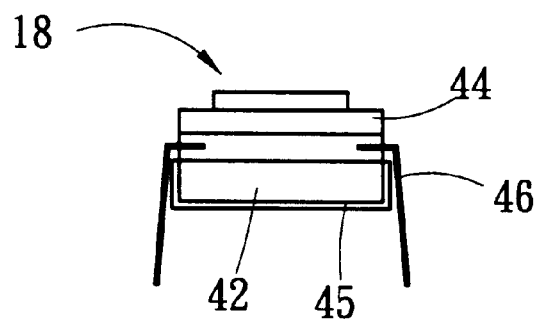

Referring to FIGS. 4A, 4B, and 4C, it is shown the top view, front view, and side view of a packaged CCD 18 of prior arts. During the package process, the bottom portion 42 of the package is based on the pins 46, i.e. the optoelectronic element 47 of the CCD 18, and the variance of configuration is generally between 0.3 mm only (the variance of the top portion 44 is larger than that). So it is possible to use the side edges 45 of the bottom portion 42 as a positioning base when the CCD 18 is mounted to a PCB or a positioning element.

Figure 5A:
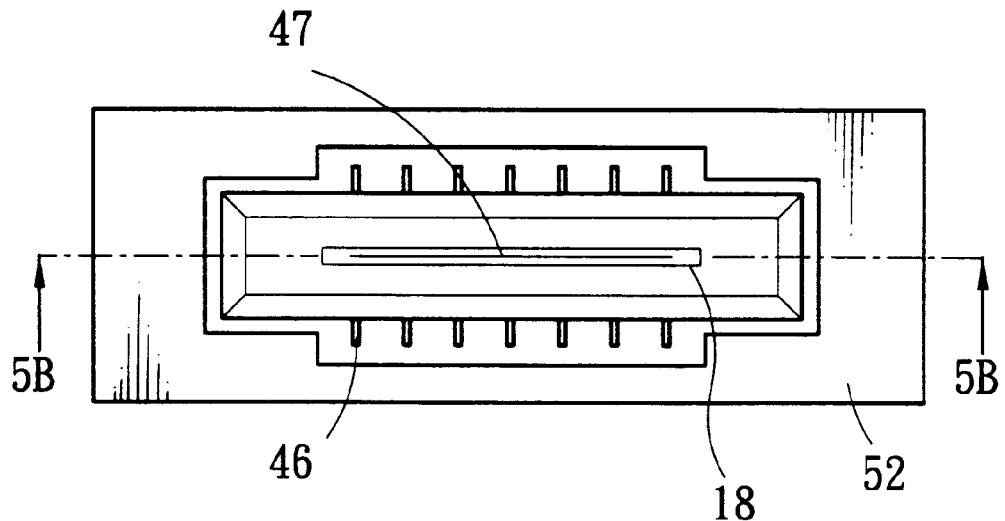
FIGS. 5A and 5B illustrate respectively the top view and the sectional front view of a positioning element for the CCD according to the present invention.
Figure 5B:
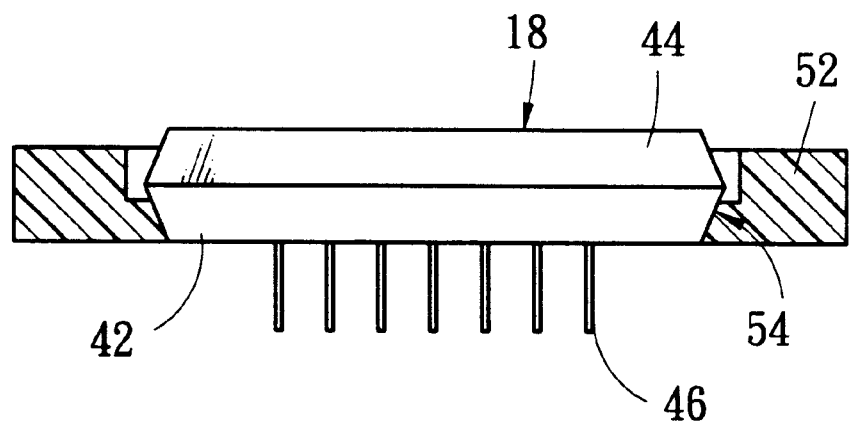

Now referring to FIGS. 5A and 5B, it is shown the top view and the sectional front view of a positioning element for CCD according to the present invention. The positioning element 52 is made of plastics or other insulating material. A matching hole 54 furnished on the element 52 for carrying the bottom portion 42 of a CCD 18 makes the optoelectronic element 47 of the CCD precisely aligned with the positioning element 52. The element 52 is further furnished with some positioning bosses or holes which are not shown here and will be described below.

Figure 6A:
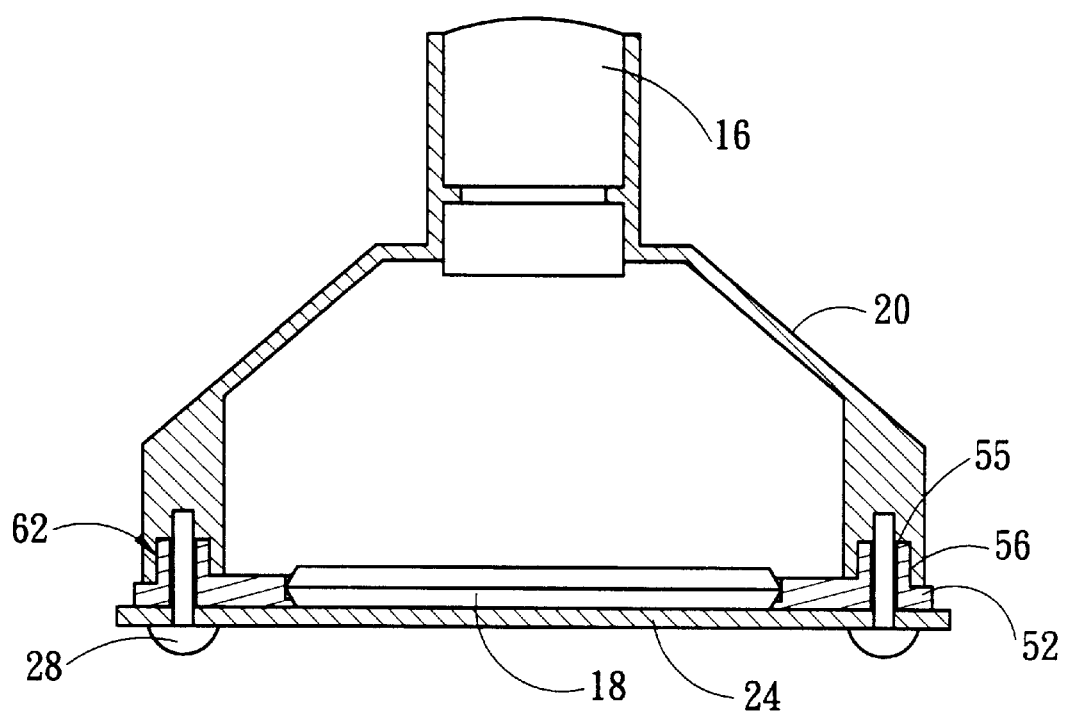
FIGS. 6A and 6B illustrate respectively a sectional view and a front view of a first embodiment of the present invention.
Figure 6B:
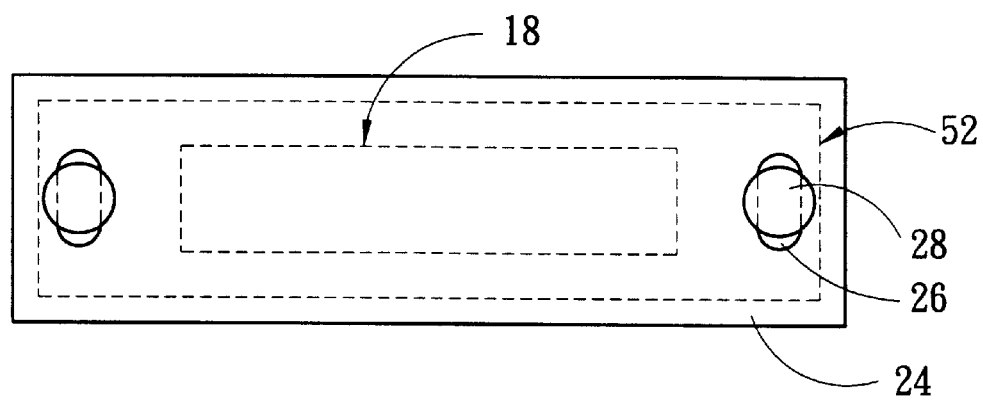

Referring now to FIGS. 6A and 6B, they illustrate a sectional view and a front view of a first embodiment of the present invention in which a positioning element 52 for a CCD 18 fastened to a CCD and lens holder 20 is shown. The holder 20 is a closed member that incorporates a lens 16 at an opening and a CCD 18 at another opening facing to the lens 18. The CCD 18 is soldered on a PCB 24 that it is fastened to the holder 20 by some fastening means such as screws 28. A positioning element 52 firmly holds the CCD 18 in a relative accurate position as described in FIGS. 5A and 5B. The CCD 18 and the positioning element 52 can be bonded together or fixed to the PCB 24. There are two boss 62 with coaxial holes 55 furnished on the positioning element 52 for two screws 28 to pass through and to fasten the PCB 24 and the element 52 to the holder 20. The holder 20 is furnished with two holes 56 that fit the bosses 62. The alignment of the CCD 18 is then achieved by the assembly in which the mechanical variances of the components are suitably controlled. Two wider slots 26 for the screws 28 to pass through are furnished on the PCB 24 to cover the possible variance of the CCD 18 soldering to the PCB.

Figure 7A:
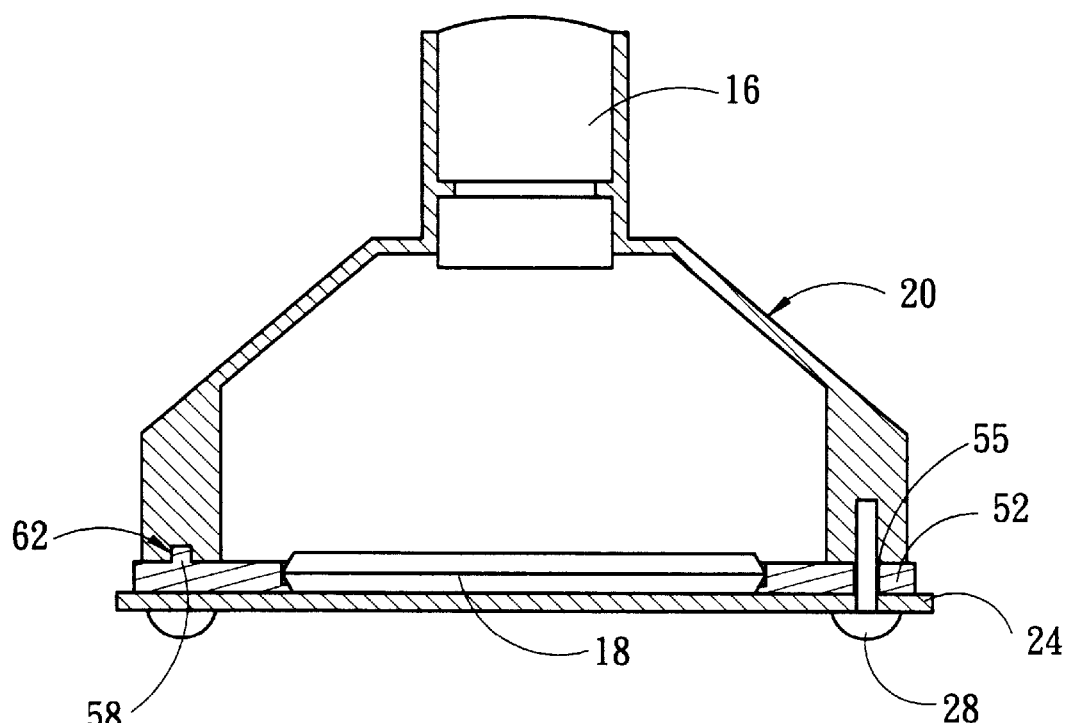
FIGS. 7A and 7B illustrate respectively a sectional view and a front view of a second embodiment of the present invention.
Figure 7B:
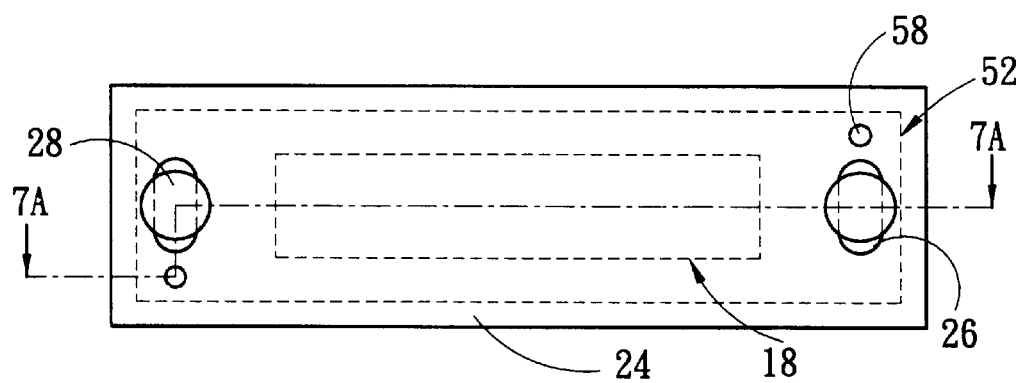

FIGS. 7A and 7B illustrate a sectional view and a front view of a second embodiment of the present invention similar to the first one of FIGS. 6A and 6B. But the bosses 58 furnished on the element 52 that position the element 52 to the holder 20 on corresponding holes are located apart from the holes 55 by the screws 28. The positioning relies on the bosses 58, so the holes 55 are wider than the diameters of the screws 28.

Figure 8A:
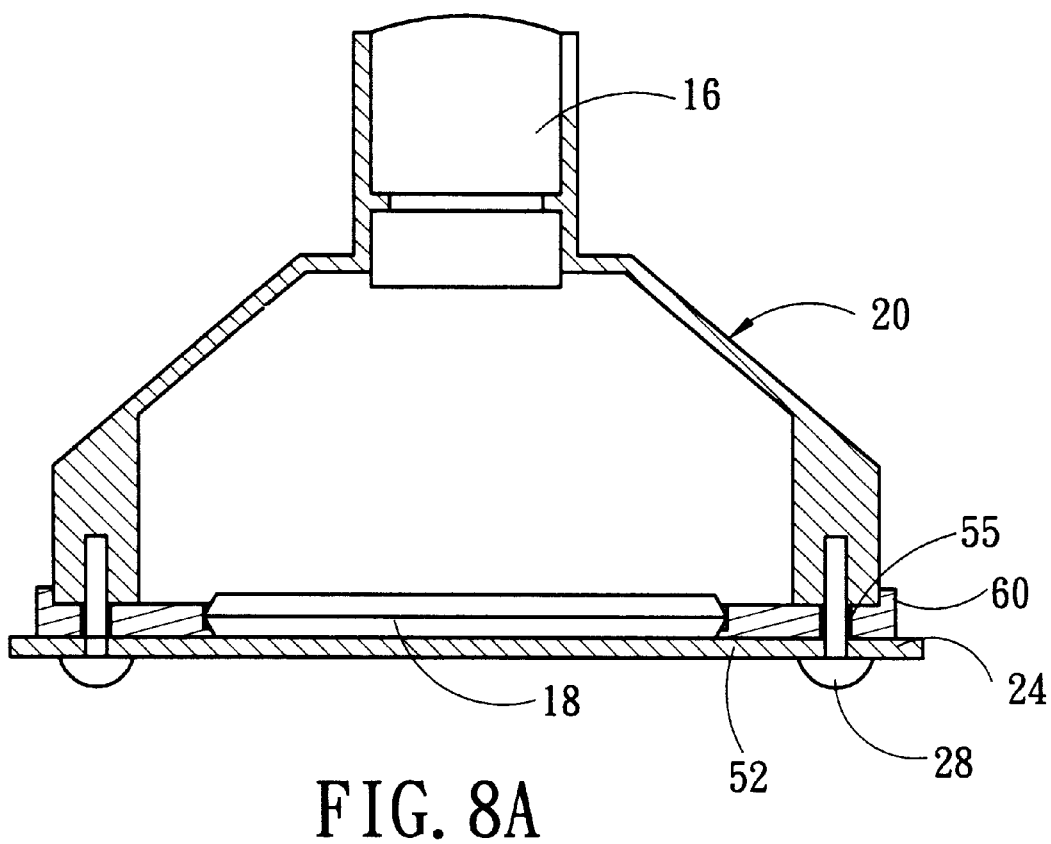
FIGS. 8A and 8B illustrate respectively a sectional view and a front view of a third embodiment of the present invention.
Figure 8B:
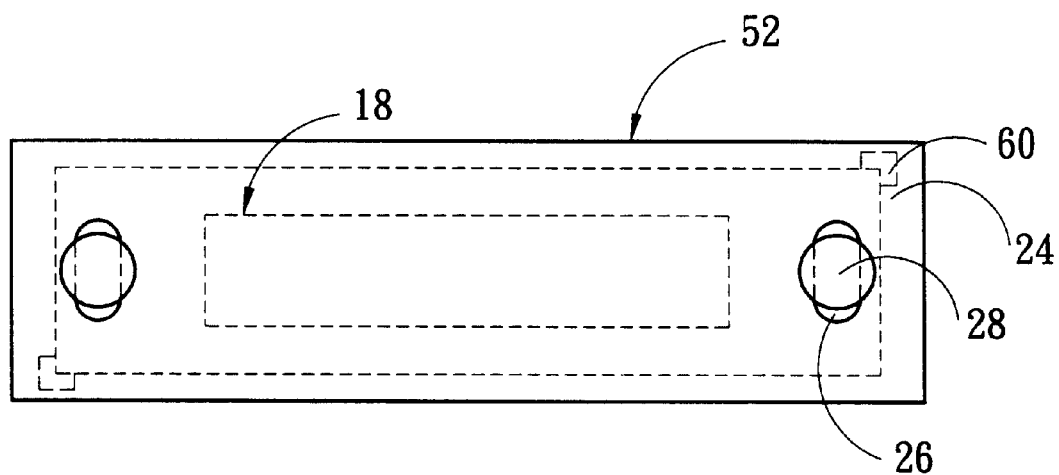

FIGS. 7A and 7B illustrate a sectional view and a front view of a third embodiment of the present invention similar to the second one of FIGS. 8A and 8B. But the positioning bosses are replaced by two corner fittings 60 furnished at two corners of the element 52 (or of the holder 20) for fitting the corresponding surfaces of the holder 20 (or the element 52).

FIG. 9 to FIG. 12 illustrate respectively inner views of further four embodiments of the present invention. The views are taken from the inner direction of the positioning elements 52.

Figure 9:
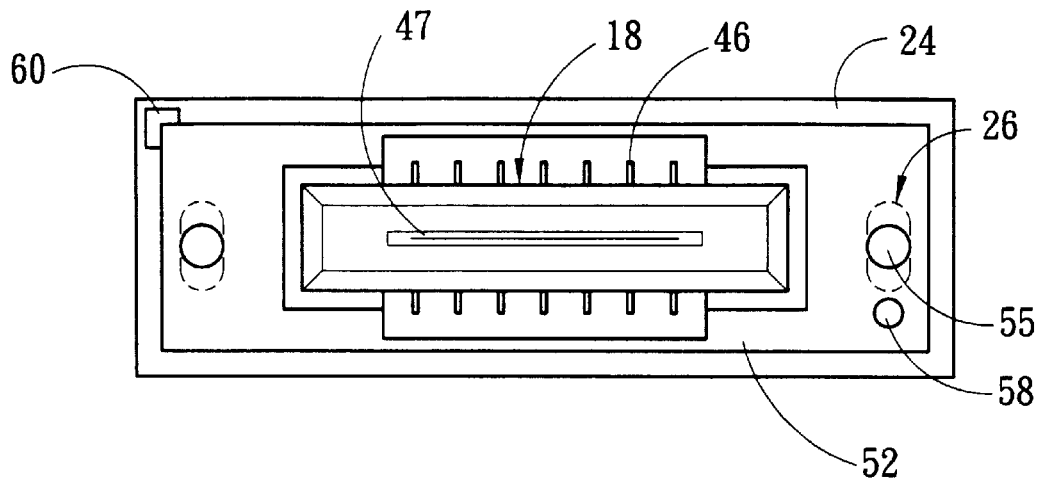
FIG. 9 to FIG. 12 illustrate respectively the inner views of further four embodiments of the present invention.

In FIG. 9, the positioning of the element 52 and the holder 20 are by a corner fitting 60 and a boss 58.

Figure 10:
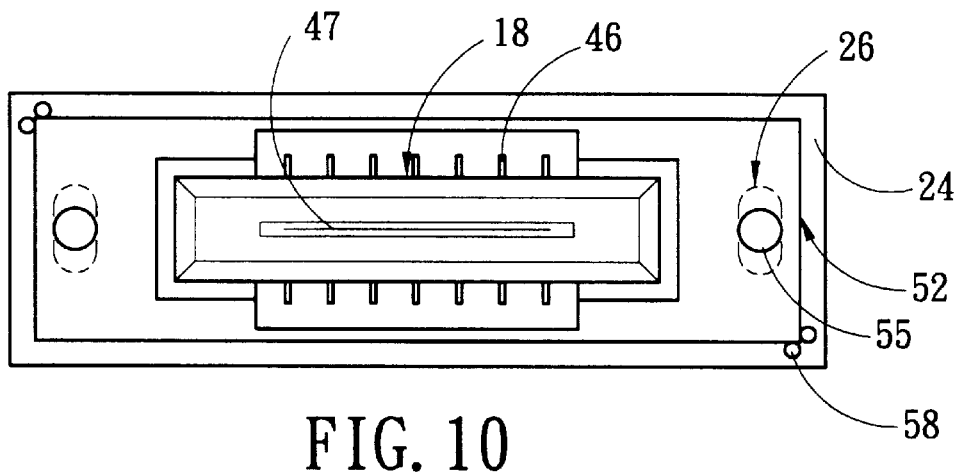

In FIG. 10, the positioning of the element 52 and the holder 20 are by two pair of corner fitting each composed of two bosses 58.

Figure 11:
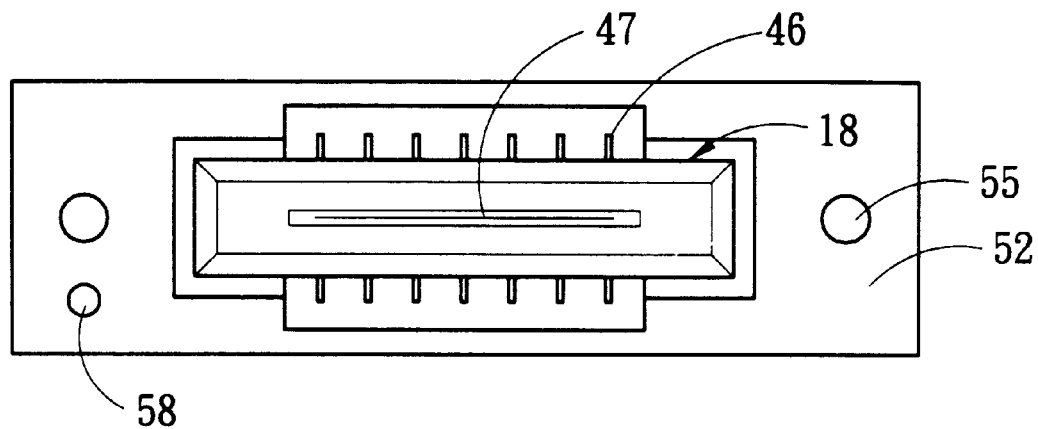

In FIG. 11, the positioning of the element 52 and the holder 20 are by a boss 58 and a corresponding hole, and in this case, the diameter of the screw hole 55 shall be close to the one of the screw that passes through for fastening.

Figure 12:
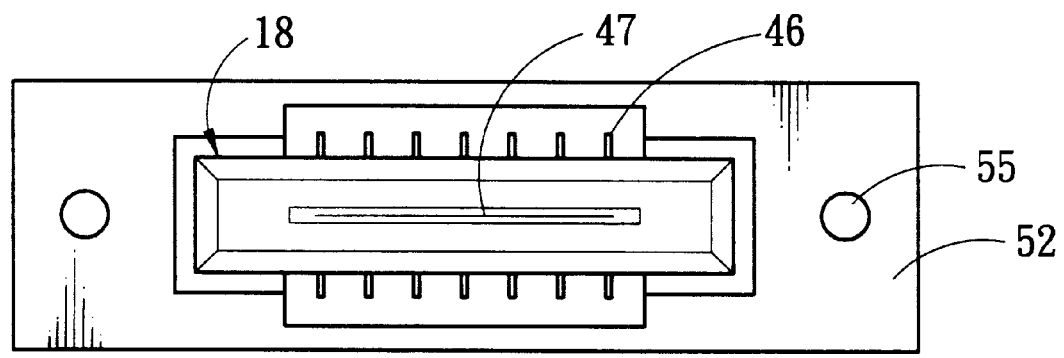

In FIG. 12, the positioning of the element 52 and the holder 20 are only by two holes 55 whose diameters are very close to the one of the screws that passes through for fastening.

Figure 13:
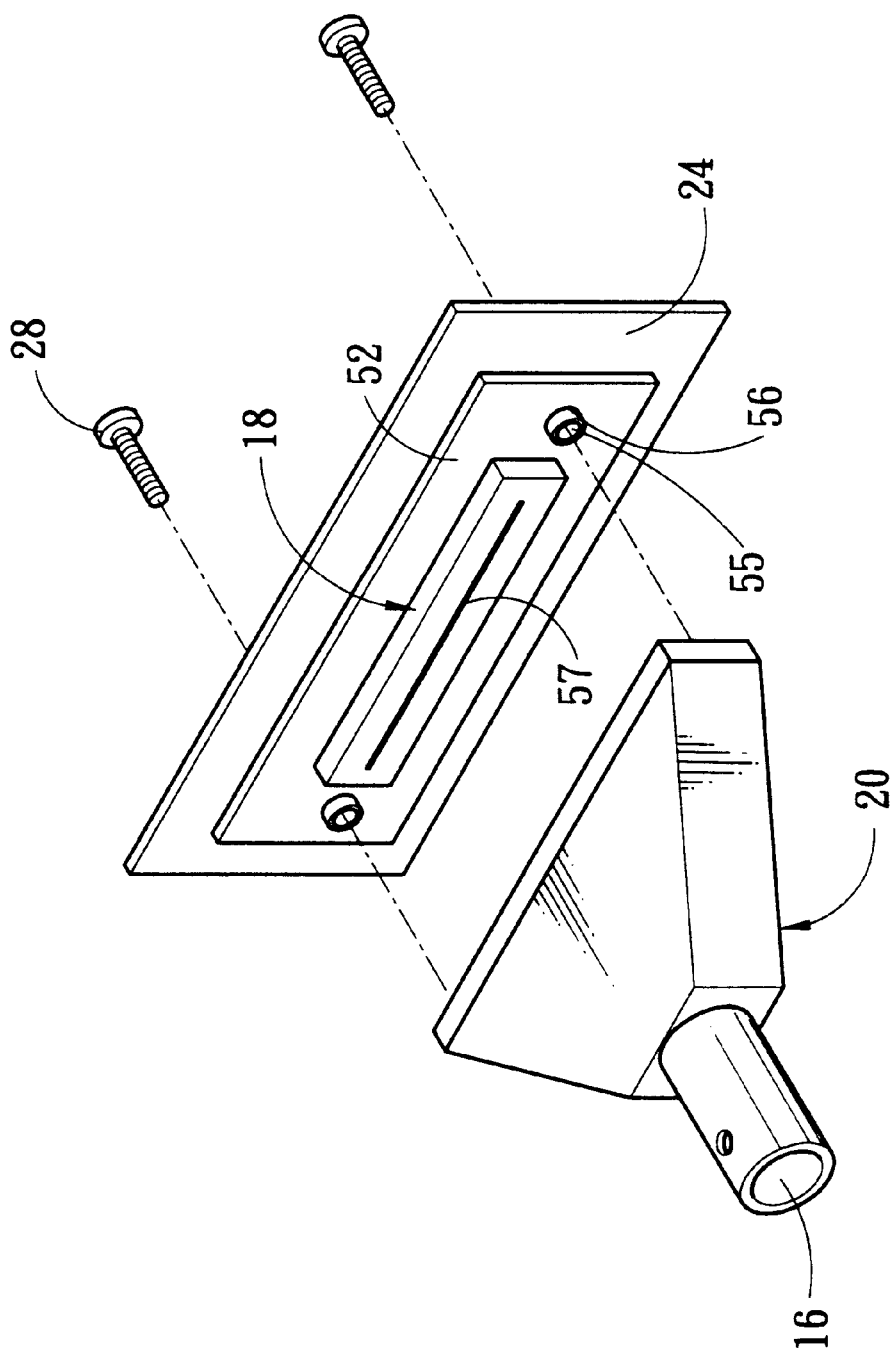
FIG. 13 is an exploded view showing the composition of a CCD positioning device as described in FIGS. 6A and 6B.

FIG. 13 is an exploded view that shows the composition of a CCD positioning device as described in FIGS. 6A and 6B.

It is apparent to those skilled in the art that various changes may be made without departing from the scope of the invention disclosed.

What is claimed is:

1. A device for aligning a charge couple device (CCD) to a scanned image in an optical scanner, comprising:
   a holder for holding a lens and a CCD;
   a tapered bottom portion affixed to said CCD, said tapered bottom has a trapezoid shape whose width decreases with distance from said CCD; and
   a positioning element provided in said holder, said position element being furnished with a matching tapered hole having the same trapezoid shape as the tapered bottom of said CCD for receiving said tapered bottom portion of said CCD and precisely fitting said CCD to said holder by a fitting means;
   wherein said positioning element has been pre-adjusted so that said CCD will be accurately positioned after said CCD is fitted to said holder to allow said lens to produce a focus image on said CCD, and said tapered bottom portion of said CCD and said matching tapered hole cooperatively eliminate a need to adjust said holder after said CCD is fitted to said holder.

2. A device according to claim 1 wherein said CCD is fixed to said holder before it is soldered on a printed circuit board, and said positioning element is held between said printed circuit board and said CCD.

3. A device according to claim 1 wherein said CCD is bonded to said matching hole of said positioning element.

4. A device according to claim 1 wherein said fitting means comprises at least a boss and a coaxial hole furnished on said positioning element; holes furnished on said holder for fitting said boss, and screws passing through said holes for fastening said positioning element and said holder.

5. A device according to claim 1 wherein said fitting means comprises at least a boss and a coaxial hole furnished on said holder; holes furnished on said positioning element for fitting said boss, and screws passing through said holes for fastening said positioning element and said holder.

6. A device according to claim 1 wherein said fitting means comprises at least a corner fitting furnished on one of said holder and said positioning element for fitting to corresponding surfaces of another one thereof, and means for fastening said positioning element and said holder.

7. A device according to claim 6 wherein each said corner fitting comprises two bosses.

8. A device according to claim 1 wherein said fitting means comprises a corner fitting and a boss furnished on one of said holder and said positioning element; corresponding surfaces and holes furnished on another one thereof, and means for fastening said positioning element and said holder.

9. A device according to claim 1 wherein said fitting means comprises a at least a boss furnished on one of said holder and said positioning element; corresponding holes furnished on another one thereof, and means for fastening said positioning element and said holder.

10. A device according to claim 1 wherein said fitting means comprises at least a hole with a diameter close to the one of said screws furnished on said positioning element; female screws furnished on said holder, and screws passing through said hole and fixing on said female screw for fastening said positioning element and said holder.

11. A device according to claim 10 wherein said fitting means further comprises at least a boss furnished on one of said positioning element and said holder; and corresponding holes furnished on another one thereof.

* * * * *